(12) United States Patent
Hillaert

(10) Patent No.: US 9,560,218 B2
(45) Date of Patent: Jan. 31, 2017

(54) REVERSE-POWERED TRANSMISSION DEVICE

(71) Applicant: Alcatel Lucent, Boulogne-Billancourt (FR)

(72) Inventor: Bart Hillaert, Putte (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/910,790

(22) PCT Filed: Aug. 28, 2014

(86) PCT No.: PCT/EP2014/068230
§ 371 (c)(1),
(2) Date: Feb. 8, 2016

(87) PCT Pub. No.: WO2015/032680
PCT Pub. Date: Mar. 12, 2015

(65) Prior Publication Data
US 2016/0191718 A1    Jun. 30, 2016

(30) Foreign Application Priority Data
Sep. 3, 2013    (EP) ..................... 13306194

(51) Int. Cl.
*H04M 3/00*    (2006.01)
*H04M 5/00*    (2006.01)
(Continued)

(52) U.S. Cl.
CPC ............. *H04M 19/08* (2013.01); *H04L 12/10* (2013.01); *H04L 12/2898* (2013.01); *H04M 19/008* (2013.01)

(58) Field of Classification Search
USPC ......................................... 379/323
See application file for complete search history.

(56) References Cited

U.S. PATENT DOCUMENTS

| 4,396,805 A * | 8/1983 | Wagner ............... H04M 19/026 379/252 |
| 2011/0037324 A1 * | 2/2011 | Perper ...................... G06F 1/26 307/140 |
| 2011/0064212 A1 | 3/2011 | Cooper et al. |

FOREIGN PATENT DOCUMENTS

EP    2120442 A1    11/2009

OTHER PUBLICATIONS

International Search Report PCT/ISA/210 for International Application No. PCT/EP2014/068230 dated Oct. 28, 2014.
(Continued)

*Primary Examiner* — Quynh Nguyen
(74) *Attorney, Agent, or Firm* — Harness, Dickey & Pierce, P.L.C.

(57) ABSTRACT

A transmission device includes a first connecting module for connecting a DC/DC power converter to a telephone wire line or to a CPE wire line, and a second connecting module between the telephone and CPE wire lines, a detection module configured to detect a power feeding request signal on the CPE wire line, and a switching module configured to controls the second connecting module in its open state, and send a power ready signal on the CPE wire line, and a not control the second connecting module and not send a signal on the CPE wire line in a standby-by state, so that a total power consumption of the detection and switching modules is lower than a threshold in a stand-by state and higher in the active state, and the detection module is configured to control the switching module in response to a detection of the power feeding request signal.

6 Claims, 1 Drawing Sheet

(51) Int. Cl.
  *H04M 19/08* (2006.01)
  *H04L 12/10* (2006.01)
  *H04L 12/28* (2006.01)
  *H04M 19/00* (2006.01)

(56) References Cited

OTHER PUBLICATIONS

Written Opinion of the International Searching Authority PCT/ISA/237 for International Application No. PCT/EP2014/068230 dated Oct. 28, 2014.
"Access, Terminals, Transmission and Multiplexing (ATTM): European Requirements for Reverse Powering of Remote Access Equipment Part 1 Architecture", ETSI Draft; REV__Powering__Architecture Commented by EE, European Telecommunications Standards Institute (ETSI), 650, Route Des Lucioles; F-06921 Sophia-Antipolis; France, May 14, 2011, pp. 1-21.

* cited by examiner

REVERSE-POWERED TRANSMISSION DEVICE

CROSS-REFERENCE TO RELATED APPLICATIONS

This is a National Phase of PCT Patent Application No. PCT/EP2014/068230, filed on Aug. 28, 2014 and claims priority to, European Application No. 13306194.5, filed Sep. 3, 2013, the contents of each of which are hereby incorporated by reference in their entirety.

FIELD OF THE INVENTION

The present invention relates to the field telecommunications. In particular, the present invention relates to a reverse-powered transmission device, for example for an access network.

BACKGROUND

A transmission device for an access network, for example a Distribution Point, may be reverse-powered from the customer premise equipment (CPE), thereby avoiding the need of a connection to the electrical network. The wire line between the Distribution Point and the CPE may be shared by a data service and a telephone service (POTS for plain old telephone service), for example.

The DC component of the POTS signal needs to be blocked to avoid conflict with the reverse power provided by the CPE. However, the DC component of the POTS should not be blocked when the Distribution Point is not powered from CPE, for example in case of power failure at the customer premises, so as to allow continuity of the POTS. For this purpose, the Distribution Point may include a lifeline relay having an open state wherein the DC component of the POTS signal is blocked and a closed state wherein said DC component is not blocked.

In that case, before starting the reverse power, it is necessary to switch the lifeline relay from the closed state to the open state. This requires power, which may be provided by batteries. However, batteries need maintenance, have to be replaced after some time, and are only operational in a limited temperature range.

SUMMARY

It is thus an object of embodiments of the present invention to propose a reverse powered device, which do not show the inherent shortcomings of the prior art.

Accordingly, embodiments relate to a transmission device comprising:
- a CPE wire line for connection to a customer premise equipment,
- a telephone wire line for connection to a telephone service provider,
- a DC/DC power converter,
- a first connecting module for connecting the DC/DC power converter to the telephone wire line or to the CPE wire line,
- a second connecting module between the telephone wire line and the CPE wire line, having an open state wherein a DC component is blocked and a closed state wherein said DC component is not blocked,
- a detection module powered by the DC/DC power converter for detecting a power feeding request signal on the CPE wire line, and
- a switching module powered by the DC/DC converter, having an active state wherein it controls the second connecting module in its open state, and sends a power ready signal on the CPE wire line, and a stand-by state wherein it does not controls the second connecting module and does not send a signal on the CPE wire line, so that a total power consumption of the detection module and the switching module in the stand-by state is lower than a predetermined threshold, and a total power consumption of the detection module and the switching module in the active state is higher than said predetermined threshold, wherein the detection module comprises means for controlling the switching module from the stand-by state to the active state in response to a detection of said power feeding request signal.

The detection module may comprise means for detecting a power active signal on the CPE wire line and for controlling the first connecting module to connect the DC/DC power converter to the CPE wire line in response to detecting said power active signal. The transmission device may comprise a data line for connection to a data service provider and a splitter connecting the telephone wire line and the data line to the CPE wire line.

The transmission device may comprise a conversion module for connecting the data line to an optical link.

Embodiments also relate to an access network comprising the above-mentioned transmission device.

The access network may comprise a customer premise equipment having a power injector and means for turning on power injection in response to a power ready signal received from the transmission device.

The access network may comprise a telephone exchange connected to the transmission device by a POTS line and comprising means for detecting an off-hook state when the current on the POTS line exceed an off-hook threshold, wherein the total power consumption of the detection module and the switching module in the stand-by state correspond to a current on the POTS line lower than said off-hook threshold, and the total power consumption of the detection module and the switching module in the active state correspond to a current on the POTS line higher than said off-hook threshold.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

Figure 1:
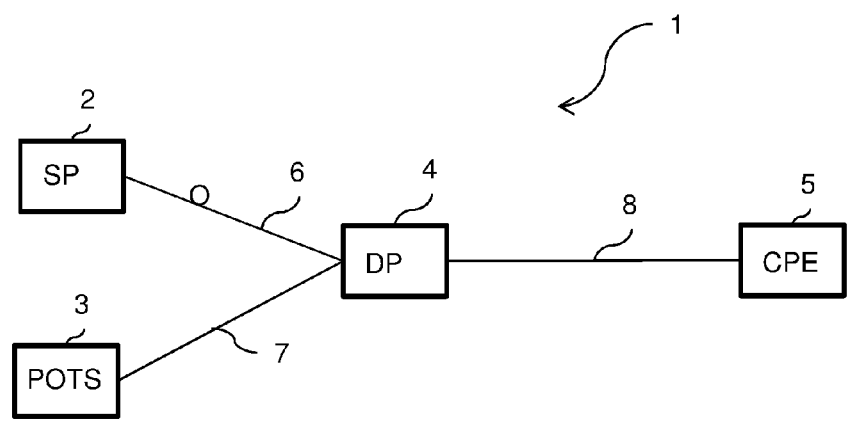
FIG. 1 is a partial view of an access network including an transmission device according to an embodiment.

FIG. 1 shows an access network 1. The access network 1 comprises a central office 2 of a data service provider, a telephone exchange 3 of a telephone service provider, a transmission device 4, which may be called a remote node or distribution point DP, and a customer premise equipment 5.

The central office 2 and the transmission device 4 are connected to each other, for example by an optical link 6. The telephone exchange 3 and the transmission device 4 are connected to each other by a POTS line 7 (a wire line). Finally, the customer premise equipment 5 and the transmission device 4 are connected to each other by a customer line 8 (a wire line).

The optical link 6, the transmission device 4 and the customer line 8 offer a data service access path between the central office 2 and the customer premise equipment 5. Similarly, the POTS line 7, the transmission device 4 and the customer line 8 offer a telephone service access path between the telephone exchange 3 and the customer premise equipment 5. As described in more detail with reference to FIG. 2, the transmission device 4 comprises a splitter 12 which allows sharing the customer line 8 between the data service access path and the telephone service access path.

The telephone exchange 3 monitors the current on the POTS line 7. When the current is lower than an off-hook threshold, the telephone exchange 3 sets the POTS line 7 in a on-hook state. When the current is higher than the off-hook threshold, the telephone exchange 3 sets the POTS line 7 in a off-hook state, wherein more power is available on the POTS line 7.

The customer premise equipment 5 comprises a power injector (not shown) capable of providing electrical power to the transmission device 4 through the customer line 8. Thus, in normal use, the transmission device 4 is reverse-powered from the customer premise equipment 5.

FIG. 1 shows one transmission device 4 and one customer premise equipment 5. However, a plurality of transmission devices 4 may be connected to the central office 2 and/or to the telephone exchange 3. Similarly, a plurality of customer premise equipments 5 may be connected to one transmission device 4.

Figure 2:
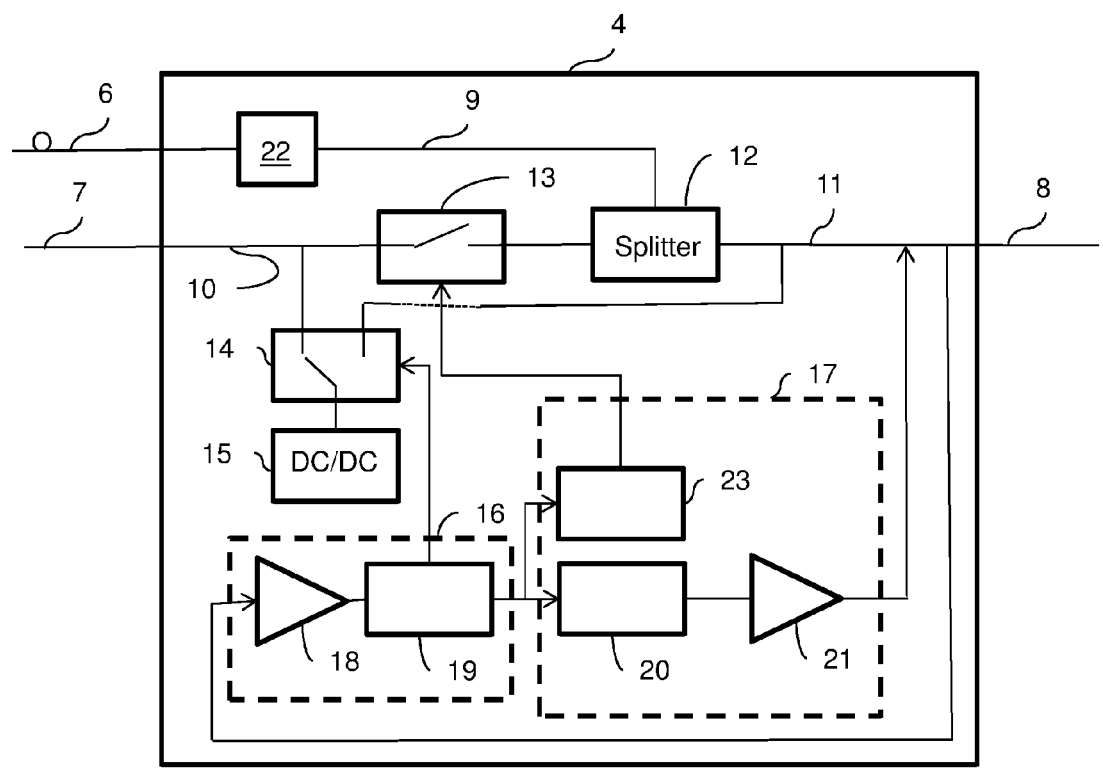
FIG. 2 is a schematic view of the transmission device of the access network of FIG. 1.

FIG. 2 is a block diagram of the transmission device 4.

The transmission device 4 comprises a data line 9, a telephone wire line 10 and a CPE wire line 11. The data line 9 is connected to the optical link 6 and the central office 2 of the data service provider, for example through conversion module 22 for converting between the optical signal of the optical link 6 and the electrical signal of the data line 9. The telephone wire line 10 extends the POTS line 7 and the CPE wire line 11 extends the customer line 8 within the transmission device 4.

The transmission device 4 also comprises a connecting module 13, for example a lifeline relay, and a splitter 12. The connecting module 13 has an open state in which a DC component is blocked, and a closed state in which the DC component is not blocked. In the closed state, the DC component of the POTS signal on the POTS line 7 passes through the telephone wire line 10, the connecting module 13, the splitter 12 and the CPE wire line 11 to the customer line 8. In contrast, in the open state, the DC component of the POTS signal on the POTS line 7 and the telephone wire line 10 is isolated from any DC component on the CPE wire line 11 and the customer line 8. By default, the connecting module 13 is in its closed state.

The splitter 12 filters the POTS signal and the data signal so that both signal share the CPE wire line 11 and the customer line 8 (for example in different frequency bands) and do not interfere between the POTS line 7 and the telephone wire line 10 or data line 9, respectively.

Furthermore, the transmission device 4 comprises a connecting module 14, for example a switch, and a DC/DC power converter 15. The connecting module 14 connects the DC/DC power converter 15 to one of the telephone wire line 10 and the CPE wire line 11. From the electric power available on the telephone wire line 10 or the CPE wire line 11 (depending on the position of the connecting module 14), the DC/DC power converter 15 provides electric power to various components of the transmission device 4: the conversion module 22, the connecting module 13, a detection module 16, a switching module 17, etc.

The detection module 16 comprises an amplifier 18 connected to the CPE wire line 11 and a signal analysis module 19 connected to the amplifier 18. The amplifier 18 and the signal analysis module 19 are configured for detecting, on the CPE wire line 11, a power feeding request signal or a power active signal from the power injector of the customer premise equipment 5. The power feeding request signal and the power active signal are predetermined signals known to the signal analysis module 19 and the power injector of the customer premise equipment 5.

The switching module 17 comprises a signal transmission module 20, an amplifier 21 and a control module 23. The signal transmission module 20 and the amplifier 21 are configured for sending a power ready signal on the CPE wire line 11, to the customer premise equipment 5. The power ready signal is a predetermined signal known to the signal transmission module 20 and the power injector of the customer premise equipment 5. The control module 23 is configured for controlling the connecting module 13 in its open state or closed state.

The switching module 17 has a standby state in which it does not sends the power ready signal and it does not control the connecting module 13, and an active state in which it sends the power ready signal and it controls the connecting module 13 in its open state.

The detection module 16 is configured for controlling the switching module 17 in its active state in response to detecting the power feeding request signal. For example, the detection module 16 closes a power switch (not shown) between the DC/DC power converter 15 and the switching module 17, thereby activating the switching module 17. The detection module 16 is also configured for controlling the connecting module 14 for connecting the DC/DC power converter to the CPE wire line 11 in response to detecting the power active signal.

In normal operation, the transmission device 4 operates in a reverse powered mode. The connecting module 14 connects the DC/DC power converter 15 to the CPE wire line 11 and the transmission device 4 is reverse powered from the customer premise equipment 5. The connecting module 13 is in its open state, thereby avoiding any conflict between the DC component of the POTS signal on the POTS line 7 and the telephone wire line 10 and the DC component on the CPE wire line 11 and the customer line 8. The data service and the telephone service may be delivered to the customer premise equipment 5.

In case no power is provided by the customer premise equipment 5, for example because of a power failure at the customer premise, the transmission device 4 operates in a reduced mode. The connecting module 14 connects the DC/DC power converter 15 to the telephone wire line 10. The connecting module 13 is its closed state. The telephone service, including the DC component, may be delivered to the customer premise equipment 5.

In the reduced mode, the detection module 16 and the switching module 17 are powered from the DC/DC power converter 15. Since detecting a signal requires limited power, the power consumption of the detection module 16 is low. The power consumption of the switching module 17 depends on its state: In the active state, sending a signal and controlling the connecting module 13 requires a relatively high power. In contrast, it its stand-by state, power consumption of the switching module 17 is lower, for example zero.

Therefore, when the switching module 17 is in its standby state, the total power consumption of the detection module 16 and the switching module 17 is lower than a predetermined threshold T. The power taken on the POTS line 7 by the DC/DC power converter 15 is limited. From the point of view of the telephone exchange 3, this low power consumption corresponds to a current on the POTS line 7 lower than the off-hook threshold mentioned before. Thus, the POTS line 7 is in a normal "On-Hook" telephone state. Also, when the switching module 17 is in its active state, the total power consumption of the detection module 16 and the switching module 17 is higher than the threshold T. The power taken on the POTS line 7 by the DC/DC power converter 15 is higher than in the stand-by state. From the point of view of the telephone exchange 3, this higher power consumption corresponds to a current on the POTS line 7 higher than the off-hook threshold. Thus, the POTS line 7 is in a normal "Off-Hook" telephone state, whereby more power can be taken from the POTS line 7. Therefore, the detection module 16 and the switching module 17 may be powered from the telephone exchange 3 without special configuration at the telephone exchange 3.

When the transmission device 4 operates in the reduce power mode and power is again available at the customer premise, the customer premise equipment 5 sends the power feeding request signal to the transmission device 4. The detection module 16 detects the power feeding request signal and activates the switching module 17. The activated switching module 17 opens the connecting module 13 and sends the power ready signal to the customer premise equipment 5. When it receives the power ready signal, the customer premise equipment 5 knows that the connecting module 13 has been open and that it can start power injection. Thus, the customer premise equipment 5 turns on reverse powering and sends the power active signal to the transmission device 4. The detection module 16 detects the power active signal and, in response, controls the connecting module 14 to connect the DC/DC power converter 15 to the CPE wire line 11. The transmission device 4 then operates in its normal mode.

As can be seen from the description above, the transmission device 4 does not require any local power source, such as batteries or a connection to electrical network, Embodiments of the method can be performed by means of dedicated hardware and/of software or any combination of both. It should be further appreciated by those skilled in the art that any block diagrams herein represent conceptual views of illustrative circuitry embodying the principles of the invention.

While the principles of the invention have been described above in connection with specific embodiments, it is to be clearly understood that this description is made only by way of example and not as a limitation on the scope of the invention, as defined in the appended claims.

The invention claimed is:

1. A transmission device, comprising:
    a customer premise equipment (CPE) wire line connected to a CPE;
    a telephone wire line connected to a plain old telephone service (POTS) telephone exchange through a POTS line, the POTS telephone exchange configured to detect an off-hook state of the transmission device when a current on the POTS line being greater than an off-hook threshold;
    a DC/DC power converter;
    a first connecting module configured to connect the DC/DC power converter to at least one of the telephone wire line and the CPE wire line;
    a second connecting module between the telephone wire line and the CPE wire line, the second connecting module configured to,
        block a DC component when the second connecting module is in an open state, and
        not block the DC component when the second connecting module being in a closed state;
    a detection module configured to,
        receive power from the DC/DC power converter, and
        detect a power feeding request signal on the CPE wire line; and
    a switching module configured to,
        receive power from the DC/DC converter,
        control the second connecting module in the open state when the switching module is in an active state, and
        send a power ready signal on the CPE wire line to the CPE when the switching module is in the active state,
        not control the second connecting module in the open state when the switching module is in a stand-by state, and
        not send the power ready signal on the CPE wire line to the CPE when the switching module is in the stand-by state,
    wherein
        the detection module and the switching module in the stand-by state have a first total power consumption, the first total power consumption is lower than a threshold, the first total power consumption corresponds to the current on the POTS line that is lower than the off-hook threshold,
        the detection module and the switching module in the active state have a second total power consumption, the second total power consumption is higher than the threshold, the second total power consumption corresponds to the current on the POTS line that is higher than the off-hook threshold, and
        the detection module is configured to control the switching module from the stand-by state to the active state based on the detection of the power feeding request signal.

2. The transmission device according to claim 1, wherein the detection module is further configured to,
    detect a power active signal on the CPE wire line, and
    control the first connecting module such that the DC/DC power converter is connected to the CPE wire line based on the detection of the power active signal.

3. The transmission device according to claim 1, further comprising:
    a data line connected to a data service provider,
    a splitter configured to connect the telephone wire line and the data line to the CPE wire line.

4. The transmission device according to claim 3, further comprising:
    a conversion module configured to connect the data line to an optical link.

5. An access network, comprising the transmission device according to claim 1.

6. The access network according to claim 5, wherein the CPE includes a power injector, the CPE is configured to turn on the power injector based on the power ready signal received from the transmission device.

* * * * *